United States Patent
Asai

(10) Patent No.: US 9,590,554 B2
(45) Date of Patent: Mar. 7, 2017

(54) ELECTRIC POWER CONVERTER

(71) Applicant: Mitsubishi Electric Corporation, Tokyo (JP)

(72) Inventor: Takamasa Asai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/902,983

(22) PCT Filed: Sep. 27, 2013

(86) PCT No.: PCT/JP2013/076303
§ 371 (c)(1),
(2) Date: Jan. 5, 2016

(87) PCT Pub. No.: WO2015/045107
PCT Pub. Date: Apr. 2, 2015

(65) Prior Publication Data
US 2016/0156302 A1 Jun. 2, 2016

(51) Int. Cl.
*H02H 7/09* (2006.01)
*H02P 29/02* (2016.01)
(Continued)

(52) U.S. Cl.
CPC ........... *H02P 29/027* (2013.01); *H02H 9/001* (2013.01); *H02P 9/02* (2013.01); *H02P 27/06* (2013.01); *H02P 27/08* (2013.01)

(58) Field of Classification Search
CPC .... H02P 3/00; H02P 5/00; H02P 27/04; H02P 27/06; H02P 23/00; H02P 25/00; H02P 27/00
(Continued)

(56) References Cited

U.S. PATENT DOCUMENTS

| 5,793,589 A | 8/1998 | Friedl | |
|---|---|---|---|
| 7,304,452 B2 * | 12/2007 | Nagai | H02P 25/024 318/432 |
| 2010/0142235 A1 | 6/2010 | Asai | |

FOREIGN PATENT DOCUMENTS

| JP | 47-26649 A | 10/1972 |
|---|---|---|
| JP | 56-32217 U | 3/1981 |

(Continued)

OTHER PUBLICATIONS

Communication dated Sep. 13, 2016 from the Japanese Patent Office in counterpart Application No. 2015-538745.
(Continued)

*Primary Examiner* — Antony M Paul
(74) *Attorney, Agent, or Firm* — Sughrue Mion, PLLC; Richard C. Turner

(57) ABSTRACT

The present invention relates to a rush current limiting circuit in which a series circuit consisting of an inductor and a resistor for detecting a current is connected between a power source and a first semiconductor switch, in which there is provided a second semiconductor switch whose inter-output-terminal voltage is controlled by the voltage across the series circuit consisting of the inductor and the resistor for detecting a current, and in which the inter-output-terminal voltage of the second semiconductor switch controls the inter-control-terminal voltage of the first semiconductor switch so as to limit a current to a load; the present invention relates also to an electric power converter including the rush current limiting circuit.

5 Claims, 5 Drawing Sheets

(51) Int. Cl.
*H02H 9/00* (2006.01)
*H02P 9/02* (2006.01)
*H02P 27/06* (2006.01)
*H02P 27/08* (2006.01)

(58) Field of Classification Search
USPC .... 318/139, 400.01, 400.02, 400.14, 400.15, 318/400.21, 400.22, 700, 701, 727, 799, 318/599, 800, 801, 805, 811, 430, 432, 318/437; 361/93.9, 111, 20, 21, 22, 23, 361/90, 91.1; 363/23, 56.07, 56.1, 56.12, 363/40, 55, 95, 120, 174, 175
See application file for complete search history.

(56) References Cited

FOREIGN PATENT DOCUMENTS

| | | |
|---|---|---|
| JP | 6-59754 A | 3/1994 |
| JP | 10-500840 A | 1/1998 |
| JP | 2010-141990 A | 6/2010 |

OTHER PUBLICATIONS

International Search Report of PCT/JP2013/076303 dated Nov. 12, 2013.

\* cited by examiner

ELECTRIC POWER CONVERTER

CROSS REFERENCE TO RELATED APPLICATIONS

This application is a National Stage of International Application No. PCT/JP2013/076303 filed Sep. 27, 2013, the contents of all of which are incorporated herein by reference in their entirety.

TECHNICAL FIELD

The present invention relates to an electric power converter including the rush current limiting circuit that is provided in a power source input unit or the like of a load and limits a rush current in a circuit for controlling current supply from the power source to the load by use of a semiconductor switch.

BACKGROUND ART

As is well known, as an example of a typical circuit that on/off-controls current supply from a power source to a load by use of a semiconductor switch, there exists a circuit including a first transistor whose emitter and collector are connected between the power source and the load, a driving transistor whose collector and emitter are connected between the base of the first transistor and the ground, and a switch connected with the base of the driving transistor. In addition, in general, a capacitor is connected between the ground potential point and the connection point between the load and the first transistor. In other words, this capacitor is connected in parallel with the load.

In the well-known circuit configured in such a way as described above, when the switch is turned on, the driving transistor is turned on; as a result, the first transistor is turned on and hence a current is supplied from the power source to the load. When the switch is turned off, the driving transistor is turned off; as a result, the first transistor is turned off and hence the current supply from the power source to the load is stopped.

In this situation, when the first transistor is turned on, a rush current for charging the capacitor flows from the power source by way of the first transistor because the capacitor connected in parallel with the load is a capacitive load. Accordingly, it is required that the first transistor has a current rating with which the first transistor can withstand this rush current. However, in the steady state after the capacitor has been charged, only a current that is determined by the load flows in the first transistor; therefore, use of a transistor, as the first transistor, that has a large current rating, i.e., a large size only for withstanding the rush current becomes a hindrance to downsizing and cost saving of a product.

Accordingly, Patent Document 1 discloses a rush current limiting circuit in which in order to make it possible to on/off-control the current supply to the load by use of a transistor having a relatively small current rating, there is provided a circuit that limits a switch-on rush current without providing any effect to the steady-state current supply to the load. In the circuit disclosed in Patent Document 1, a resistor for detecting a rush current is connected between the emitter of the first transistor and the power source, and there is provided a second transistor that is connected, by way of this resistor, between the emitter and the base of the first transistor. The other configurations are the same as those in the foregoing well-known circuit.

In the conventional rush current limiting circuit disclosed in Patent Document 1, when the switch is turned on, the driving transistor is turned on; as a result, the first transistor is turned on and hence a current is supplied from the power source to the load. In this situation, a rush current for charging the capacitor connected in parallel with the load flows from the power source by way of the first transistor; however, because the resistor for detecting a rush current is connected between the power source and the first transistor, a voltage difference corresponding to the rush current is generated across the resistor.

The voltage difference across the resistor functions as a base bias voltage for the second transistor; thus, when the rush current exceeds a predetermined value, the second transistor is turned on and hence the base bias voltage for the first transistor becomes smaller; therefore, because the voltage between the emitter and the collector of the first transistor becomes larger, the voltage difference across the resistor works in such a way as to suppress the rush current from increasing. In other words, appropriate setting of the value of the resistor makes it possible to suppress the rush current that flows in the first transistor.

PRIOR ART REFERENCE

Patent Document

[Patent Document 1] Japanese Patent Application Laid-Open No. H6-59754

DISCLOSURE OF THE INVENTION

Problems to be Solved by the Invention

The increasing speed of the rush current in the conventional rush current limiting circuit disclosed in above-mentioned Patent Document 1 is determined by the voltage difference between the voltage of the power source and the voltage across the capacitor and the impedance of the current path from the power source to the capacitor; in general, the increasing speed is extremely large. In contrast, the turn-on speed of the second transistor and the turn-off speed of the first transistor are as fast as a 2-digit-order speed (ns) even when extremely-high-speed transistors are utilized, and it is after the actual rush current reaches the limit current value set by use of the resistor that the operation of limiting the rush current begins.

Thus, the operational delay in the second transistor and the first transistor causes a large overshoot of the actual rush current in the foregoing conventional rush current limiting circuit. In particular, the overshoot of the rush current at a time when in the steady state in which the switch for on/off-controlling the driving transistor has been turned on, the voltage of the power source steeply rises due to some causes is likely to be more drastic than the overshoot of the rush current at a time when the switch is turned on. The large overshoot of the rush current requires a transistor having a larger current rating in selecting the first transistor; with regard to the EMC (Electromagnetic Compatibility), the steep current change can be a source of noise to be transferred and emitted. Accordingly, especially in an application where the steep rise of the power source voltage frequently occurs, the measures for the rush current becomes a more important issue.

The present invention has been implemented in order to solve the foregoing problems in the conventional rush current limiting circuit; the objective thereof is to provide an electric power converter provided with the rush current limiting circuit that makes it possible to on/off-control current supply to a load by use of a semiconductor switch having a relatively small current rating, without providing any effect to the steady-state current supply to the load, and that is superior in terms of the EMC performance.

Means for Solving the Problems

An electric power converter according to the present invention includes an electric-power conversion unit that has a three-phase bridge circuit in which each of arms is formed of a power semiconductor switch, in which a DC power source is connected between DC terminals, and in which each of armature windings of a rotating electric machine is connected between corresponding AC terminals; and
  a control circuit that controls the power semiconductor switches,
    wherein there are provided a motor operation mode in which the rotating electric machine is made to operate as a motor and an electric-power-generator operation mode in which the rotating electric machine is made to operate as an electric power generator,
    wherein in the motor operation mode, the power semiconductor switches are controlled by the control circuit in such a way that the electric-power conversion unit converts DC electric power from the DC power source into AC electric power, and in the electric-power-generator operation mode, the power semiconductor switches are controlled by the control circuit in such a way that the electric-power conversion unit converts AC electric power outputted from the rotating electric machine, which is driven by a driving source so as to generate electric power, into DC electric power,
    wherein the control circuit is supplied with an operational power source from the DC power source through a positive electrode of DC terminals of the electric-power conversion unit, by way of a rush current limiting circuit, and in the electric-power-generator operation mode, the control circuit controls the power semiconductor switches in such a way that one pulse is energized in synchronization with an electric-angular cycle of a rotor of the rotating electric machine, and
    wherein the rush current limiting circuit has a series circuit that is connected between the DC power source and the first semiconductor switch and is formed of an inductor and a current detection resistor that are connected in series with each other and a second semiconductor switch whose inter-output-terminal voltage is controlled by a voltage across the series circuit; and based on an inter-output-terminal voltage of the second semiconductor switch, the rush current limiting circuit controls an inter-control-terminal voltage of the first semiconductor switch so as to limit an electric current to the control circuit.

Advantage of the Invention

The rush current limiting circuit according to the present invention makes it possible that without providing any effect to steady-state current supply to the load, a rush current at a time when the switch is turned on or when the power source voltage steeply rises is smoothly limited without causing any overshoot; thus, there can be obtained a rush current limiting circuit that makes it possible to turn on or off current supply to the load by a transistor having a relatively small current rating and that is superior in the EMC performance.

Moreover, because having a rush current limiting circuit, the electric power converter according to the present invention makes it possible to internally supply an operational power source for the control circuit from the DC terminal thereof. As a result, no vehicle harnesses and connector connection points for externally supplying a power source dedicated to the operating power source for the control circuit are required; therefore, simplification and weight-saving of the vehicle harness can be achieved; concurrently, the anxiety of a loosely connected connector or a broken harness is eliminated and hence the reliability of the system is raised.

BEST MODE FOR CARRYING OUT THE INVENTION

Figure 6:
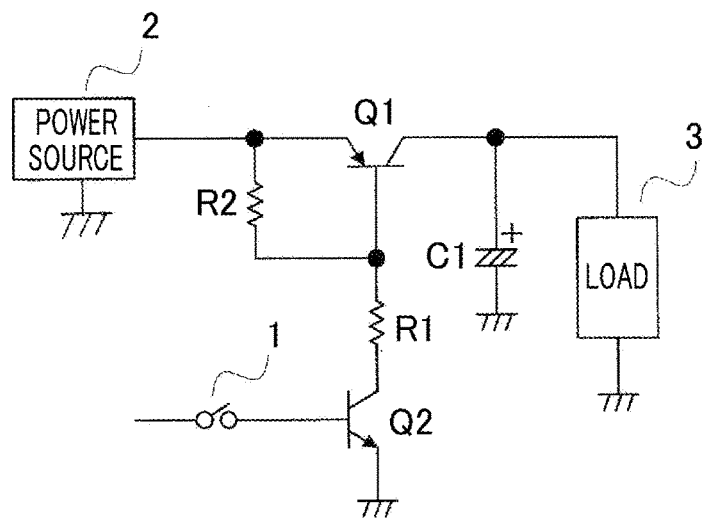
FIG. 6 is a circuit diagram illustrating a well-known circuit for on/off-controlling current supply to a load.

At first, for the sake of better understanding of a rush current limiting circuit according to the present invention, a technology that is the background of the present invention will be explained. FIG. 6 is a circuit diagram illustrating the foregoing well-known circuit for on/off-controlling current supply to a load. In FIG. 6, when a switch 1 is turned on, a turn-on voltage is applied to the base of a driving transistor Q2 and hence a first transistor Q1 is turned on. Because the first transistor Q1 is turned on, a power source 2 supplies a current to a load 3. In this situation, when the first transistor Q1 is turned on, a rush current for charging a capacitor C1 flows from the power source 2 by way of the first transistor Q1 because the capacitor C1 connected in parallel with the load 3 is a capacitive load.

Accordingly, it is required that the first transistor Q1 has a current rating with which the first transistor Q1 can withstand this rush current. However, in the steady state after the capacitor C1 has been charged, only a current that is determined by the load 3 flows in the first transistor Q1; therefore, use of a transistor, as the first transistor Q1, that has a large current rating, i.e., a large size only for withstanding the rush current becomes a hindrance to downsizing and cost saving of a product.

Figure 7:
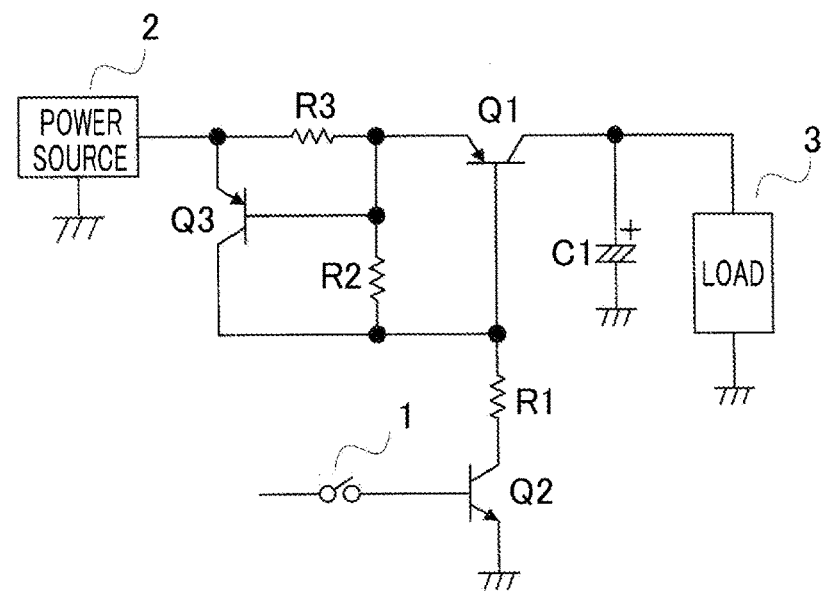
FIG. 7 is a circuit diagram illustrating a conventional rush current limiting circuit.

Accordingly, Patent Document 1 discloses a circuit in which in order to make it possible to on/off-control the current supply to the load by use of a transistor having a relatively small current rating, there is provided a rush current limiting circuit that limits a switch-on rush current without providing any effect to the steady-state current supply to the load. FIG. 7 is a circuit diagram illustrating the conventional rush current limiting circuit disclosed in Patent Document 1.

In FIG. 7, when the switch 1 is turned on, the first transistor Q1 is turned on and hence a rush current for charging the capacitor C1 flows from the power source 2 by way of the first transistor Q1. In this situation, because a resistor R3 for detecting a rush current is connected between the power source 2 and the first transistor Q1, a voltage difference corresponding to the rush current occurs across the resistor R3. The voltage difference functions as a base bias voltage for a second transistor Q3; thus, when the rush current exceeds a predetermined value, the second transistor Q3 is turned on and hence the base bias voltage for the first transistor Q1 becomes smaller; therefore, because the voltage between the emitter and the collector of the first transistor Q1 becomes larger, the voltage difference works in such a way as to suppress the rush current from increasing. In other words, appropriate setting of the value of the resistor R3 makes it possible to suppress the rush current that flows in the first transistor Q1.

However, the increasing speed of the rush current in the circuit illustrated in FIG. 7 is determined by the voltage difference between the voltage of the power source 2 and the voltage across the capacitor C1 and the impedance (for a transient action such as a rush current, the inductance component of the wiring lead is dominant) of the current path from the power source 2 to the capacitor C1; in general, the increasing speed is extremely large. In contrast, the turn-on speed of the second transistor Q3 and the turn-off speed of the first transistor Q1 are as fast as a 2-digit-order speed (ns) even when extremely-high-speed transistors are utilized, and it is after the actual rush current reaches the limit current value set by use of the resistor R3 that the operation of limiting the rush current begins.

Thus, the operational delay in the second transistor Q3 and the first transistor Q1 causes a large overshoot of the actual rush current in the circuit illustrated in FIG. 7. In particular, the overshoot of the rush current at a time when in the steady state in which the switch 1 has been turned on, the voltage of the power source 2 steeply rises due to some causes is likely to be more drastic than the overshoot of the rush current at a time when the switch 1 is turned on. The large overshoot of the rush current requires a transistor having a larger current rating in selecting the first transistor Q1; with regard to the EMC, the steep current change can be a source of noise to be transferred and emitted. Accordingly, especially in an application where the steep rise of the power source voltage frequently occurs, the measures for the rush current becomes a more important issue.

Embodiment 1

Figure 1:
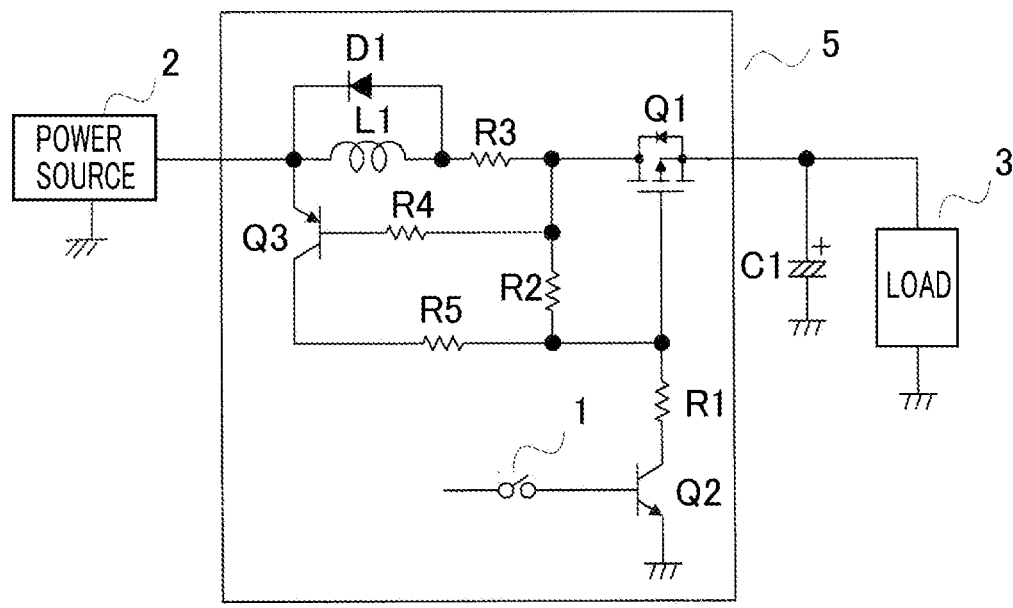
FIG. 1 is a circuit diagram illustrating a rush current limiting circuit according to Embodiment 1 of the present invention.

Hereinafter, a rush current limiting circuit according to Embodiment 1 of the present invention will be explained in detail with reference to the drawings. FIG. 1 is a circuit diagram illustrating the rush current limiting circuit according to Embodiment 1 of the present invention. In FIG. 1, a rush current limiting circuit 5 is connected between a power source 2 and the connection point between a load 3 and a capacitor C1. In the rush current limiting circuit 5, a first transistor Q1, which is a P-channel-type transistor, is a first semiconductor switch for controlling current supply from the power source 2 to a parallel circuit consisting of the load 3 and the capacitor C1; the parallel circuit consisting of the load 3 and the capacitor C1 is connected with the drain terminal of the first transistor Q1; a series circuit consisting of an inductor L1 and a rush current detection resistor R3 is connected between the source terminal of the first transistor Q1 and the power source 2; the collector terminal of a driving transistor Q2, which is an NPN-type transistor and functions as an on/off-control semiconductor switch, is connected with the gate terminal of the first transistor Q1 by way of a first resistor R1.

The inductor L1 is an inductor (coil) for detecting the state where the voltage difference between the voltage of the power source 2 and the voltage across the capacitor C1 is large, i.e., the state where a rush current occurs. A diode D1 connected in parallel with the inductor L1 is to circulate an electric current flowing in the inductor L1 when the first transistor Q1 is turned off and hence to make the energy in the inductor L1 consumed. Furthermore, there is provided a second transistor Q3, which is a PNP-type transistor and controls the rush current; the emitter terminal thereof is connected with the power source 2; the collector terminal thereof is connected with the gate terminal of the first transistor Q1 by way of a fifth resistor R5; the base terminal thereof is connected with the source terminal of the first transistor Q1 by way of a fourth resistor R4.

A switch 1 is turned on when the power source 2 supplies a current to the load 3, and is connected with the base terminal of the driving transistor Q2. The power source 2 is a DC power source such as a battery. A second resistor R2 is connected between the gate terminal and the source terminal of the first transistor Q1 and is utilized for controlling the voltage between the gate and the source of the first transistor Q1 when the first transistor Q1 is turned on or off. The resistance value of the fifth resistor R5 is set to be small enough in comparison with that of the first resistor R1.

Next, the operation of the rush current limiting circuit 5 will be explained. When the power source 2 supplies an electric current to the load 3, the switch 1 is turned on. When the switch 1 is turned on, a turn-on voltage is applied to the base of the driving transistor Q2, so that the driving transistor Q2 is turned on. When the driving transistor Q2 is turned on, a bias voltage exceeding the turn-on threshold value is applied between the gate and the source of the first transistor Q1, and hence the first transistor Q1 is turned on. When the first transistor Q1 is turned on, the power source 2 supplies an electric current to the parallel circuit consisting of the load 3 and the capacitor C1; because the capacitor C1 is a capacitive load, a rush current for charging the capacitor C1 flows from the power source 2 by way of the first transistor Q1.

As described above, the series circuit consisting of the inductor L1 and the third resistor R3 for detecting a rush current is connected between the source terminal of the first transistor Q1 and the power source 2; in the state where such a rush current flows, i.e., in the state where the voltage difference between the voltage of the power source 2 and the voltage across the capacitor C1 is large, the voltage across the inductor L1 rises. This voltage hike makes the base bias voltage for the second transistor Q3 exceed the turn-on voltage and hence the base current flows; thus, the second transistor Q3 is turned on.

As a result, the voltage between the gate and the source of the first transistor Q1 decreases down to the turn-on threshold value and hence the voltage between the drain and the source of the first transistor Q1 rises; then, while keeping balance, the rush current from the power source 2 to the capacitor C1 smoothly increases in such a way that the voltage across the series circuit consisting of the inductor L1 and the third resistor R3 becomes approximately 1[V]. After that, when the rush current reaches a limit current value set by use of the third resistor R3, the value of the rush current is automatically controlled so as to be constant at the limit current value until the capacitor C1 is completely charged.

Furthermore, when after that, the capacitor C1 has been completely charged and the supply current from the power source 2 becomes smaller than the limit current value set by use of the third resistor R3, the base bias voltage for the second transistor Q3 becomes smaller than the turn-on voltage and hence the base current dose not flow; thus, the second transistor Q3 is turned off. As a result, a sufficient bias voltage is applied between the gate and the source of the first transistor Q1 and hence the first transistor Q1 is completely turned on; then, the mode moves to the steady state where the switch 1 is on.

Because in the foregoing steady state, all of the resistance values of the inductor L1, the third resistor R3 for detecting a rush current, and the first transistor Q1 are small, the application of the rush current limiting circuit 5 does not provide any effect to the steady-state current that flows in the load 3. The component selection condition for the first transistor Q1 in the rush current limiting circuit 5 is that a transistor to be selected has a rated current with which the transistor can withstand the rush current limit value and has an electric power capacity with which the transistor can withstand a short-time power loss at a time when the transistor works while a rush current is limited.

Next, there will be explained the operation of the rush current limiting circuit 5 at a time when in the steady state where the switch 1 is on, i.e., the first transistor Q1 is completely on, the voltage of the power source 2 steeply rises. Because in the steady state where the switch 1 is on, the load current is supplied from the power source 2 to the load 3 by way of the inductor L1, the third resistor R3, and the first transistor Q1 that have respective small resistance values, the voltage of the power source 2 and the voltage across the capacitor C1 are almost equal to each other; however, in the case where in that situation, the voltage of the power source 2 steeply rises, a large electric potential difference between the power source 2 and the capacitor 1 occurs. As a result, a rush current for charging the capacitor C1 flows from the power source 2 by way of the first transistor Q1. Because the operation thereafter of the rush current limiting circuit 5 is the same as that at the foregoing time when the switch 1 is turned on, the explanation herein will be omitted.

Next, there will be explained the operation of the rush current limiting circuit 5 at a time when in the steady state where the switch 1 is on, i.e., the first transistor Q1 is completely on, the switch 1 is turned off so that current supply from the power source 2 to the load 3 is cut off. When the switch 1 is turned off, the driving transistor Q2 is turned off and hence the first transistor Q1 is also turned off; after that, the energy that is generated by the supply current to the load 3, which has been flowing in the inductor L1 immediately before the first transistor Q1 is turned off and is accumulated in the inductor L1, is consumed because a circulation current flows in the inductor L1 and the diode D1 connected in parallel with the inductor L1.

In other words, because the diode D1 is connected in parallel with the inductor L1, the energy accumulated in the inductor L1 is eliminated from the energy that is consumed by the first transistor Q1 when the first transistor Q1 is turned off; therefore, it is made possible to safely turn off the first transistor Q1 without breaking the first transistor by excessive electric power. The energy accumulated in the inductor L1 depends on the inductance thereof and the value of the current that has been flowing therein; in the case where when the first transistor Q1 is turned off, the first transistor Q1 can safely consume the energy accumulated in the inductor L1, the diode D1 is not required.

As described above, in the rush current limiting circuit 5 according to Embodiment 1 of the present invention, appropriate setting of the resistance value of the third resistor R3 for detecting a rush current and the inductance of the inductor L1 makes it possible to smoothly limit the respective rush currents at a time when the switch 1 is turned on and at a time when the voltage of the power source 2 steeply rises, without causing any overshoot and providing any effect to the steady-state current supply to the load; therefore, it is made possible to turn on or off the current supply to the load by a transistor having a relatively small current rating, i.e., a compact and inexpensive transistor, and it is also made possible to obtain a rush current limiting circuit that is superior in the EMC performance. Moreover, it is also made possible that when the current supply to the load 3 is cut off, the first transistor Q1 is safely turned off without being broken by excessive electric power.

Embodiment 2

Figure 2:
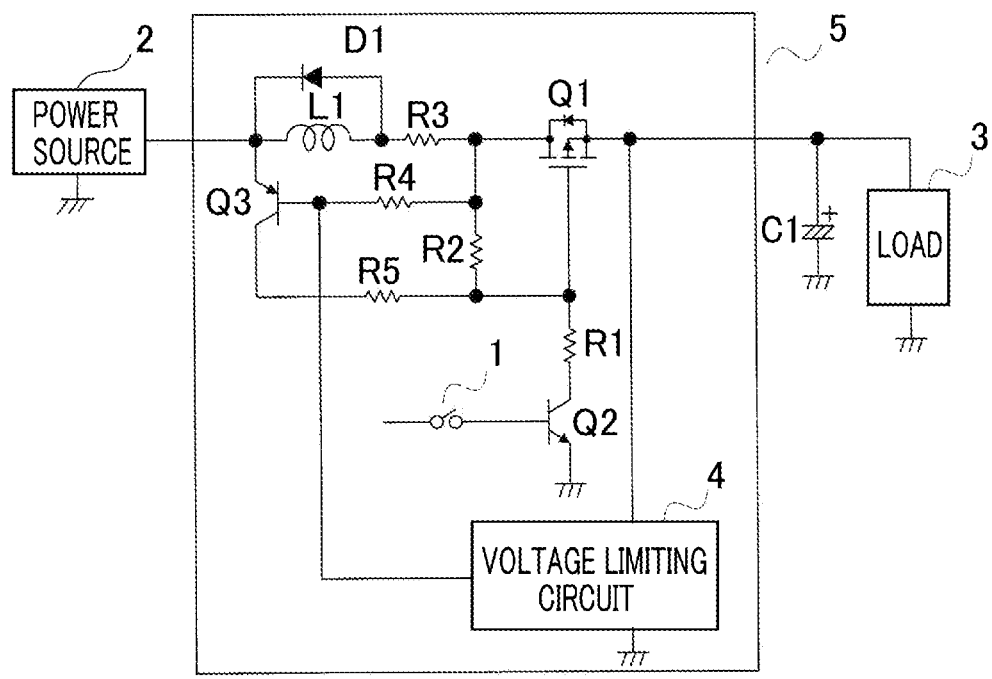
FIG. 2 is a circuit diagram illustrating a rush current limiting circuit according to Embodiment 2 of the present invention.

Next, a rush current limiting circuit according to Embodiment 2 of the present invention will be explained in detail with reference to the drawings. FIG. 2 is a circuit diagram illustrating the rush current limiting circuit according to Embodiment 2 of the present invention. The rush current limiting circuit, according to Embodiment 2 of the present invention, illustrated in FIG. 2 is obtained by adding a voltage limiting function for the load 3 to the rush current limiting circuit according to Embodiment 1, which has been described with reference to FIG. 1. As illustrated in FIG. 2, the input terminal of a voltage limiting circuit 4 is connected with the power-source-side terminal of the load 3 and the output terminal thereof is connected with the base terminal of the second transistor Q3.

When the voltage applied to the load 3 becomes the same as or larger than a predetermined value, the voltage limiting circuit 4 turns on the second transistor Q3. When as a result, the second transistor Q3 is turned on, the first transistor Q1 is turned off. When the first transistor Q1 is turned off, the current supply from the power source 2 to the parallel connection circuit consisting of the load 3 and the capacitor C1 is stopped; thus, the voltage across the capacitor C1 decreases as the load 3 consumes the current. As a result, the use of the voltage limiting circuit 4 makes it possible to limit the voltage to be applied to the load 3 to the predetermined value, regardless of the voltage of the power source 2, so as to protect the load 3 against an excessive voltage.

As described above, the rush current limiting circuit according to Embodiment 2 of the present invention makes it possible to supply a current to the load 3 while protecting the load 3 against an excessive voltage, on top of the effect that has been described in Embodiment 1.

Variant Examples of Embodiments 1 and 2

In each of the rush current limiting circuit, illustrated in FIG. 1, according to Embodiment 1 of the present invention and the rush current limiting circuit, illustrated in FIG. 2, according to Embodiment 2 of the present invention, the first transistor Q1 is formed of a P-channel-type MOSFET; however, as the first transistor Q1, a PNP-type bipolar transistor can be utilized. Moreover, even when the connection order of the parallel circuit consisting of the inductor L1 and the diode D1 and the third resistor R3 for detecting a rush current in each of FIGS. 1 and 2 is changed, the same effect is obtained. Still moreover, the diode D1 may be connected in parallel with the series connection circuit consisting of the inductor L1 and the third resistor R3. Furthermore, it may be allowed that the output terminal of the voltage limiting circuit 4 is connected with the base terminal of the driving transistor Q2 so that when an excessive voltage across the load 3 is detected, the driving transistor Q2 is turned off.

Embodiment 3

Figure 3:
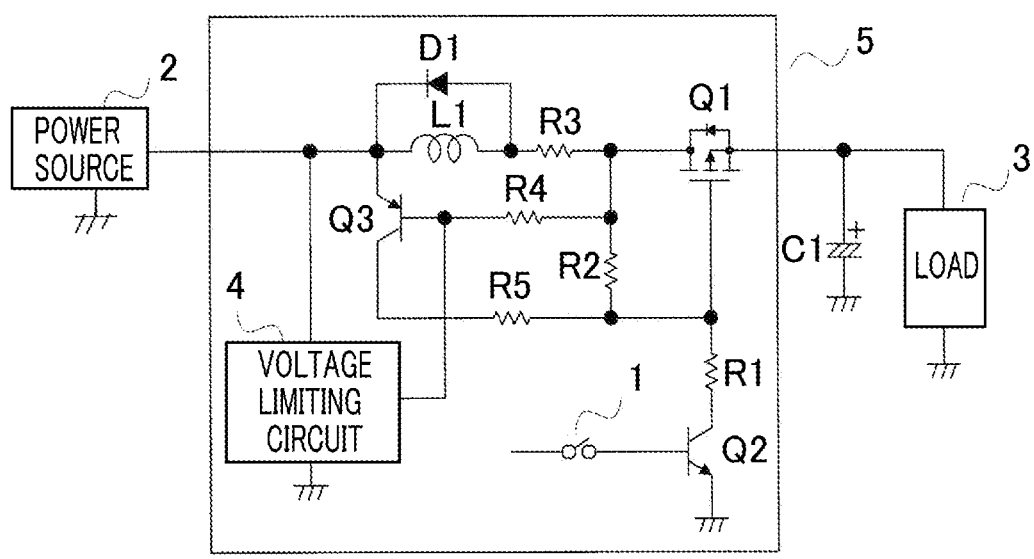
FIG. 3 is a circuit diagram illustrating a rush current limiting circuit according to Embodiment 3 of the present invention.

Next, a rush current limiting circuit according to Embodiment 3 of the present invention will be explained in detail with reference to the drawings. FIG. 3 is a circuit diagram illustrating the rush current limiting circuit according to Embodiment 3 of the present invention. As illustrated in FIG. 3, the input terminal of the voltage limiting circuit 4 is connected with the output terminal of the power source 2 and the output terminal thereof is connected with the base terminal of the second transistor Q3. The other configurations are the same as those in Embodiment 2 illustrated in FIG. 2.

When the output voltage of the power source 2 becomes the same as or larger than a predetermined value, the voltage limiting circuit 4 turns on the second transistor Q3. When as a result, the second transistor Q3 is turned on, the first transistor Q1 is turned off. When the first transistor Q1 is turned off, the current supply from the power source 2 to the parallel connection circuit consisting of the load 3 and the capacitor C1 is stopped. As a result, it is made possible to limit the voltage to be applied to the load 3 to the predetermined value, regardless of the voltage of the power source 2, so as to protect the load 3 against an excessive voltage. Due to the operation of the voltage limiting circuit 4, no current is supplied to the load 3 when the voltage of the power source 2 is excessive; however, when it does not particularly matter with the system, the load 3 can be protected against the excessive voltage of the power source 2.

Embodiment 4

Figure 4:
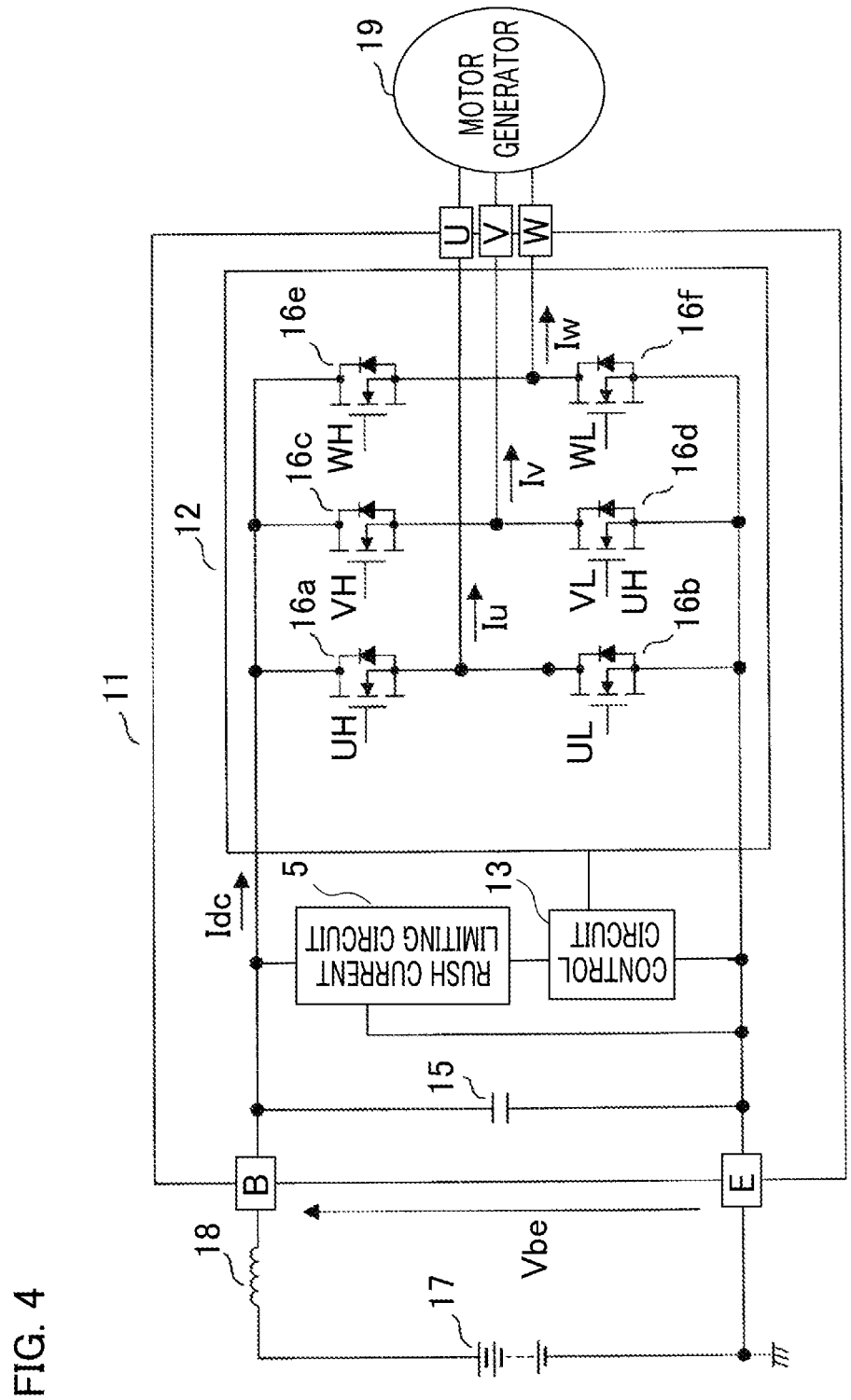
FIG. 4 is a configuration diagram illustrating an electric power converter according to Embodiment 4 of the present invention.

Next, an electric power converter according to Embodiment 4 of the present invention will be explained. FIG. 4 is a configuration diagram illustrating an electric power converter according to Embodiment 4 of the present invention; there is illustrated an example in which the rush current limiting circuit 5 according to any one of Embodiments 1 through 3 is applied to an application where a steep rise in the power source frequently occurs. The electric power converter illustrated in FIG. 4 is applied to a vehicle motor generator system. The vehicle motor generator system illustrated in FIG. 4 is provided with an electric power converter 11 according to Embodiment 4 of the present invention and a motor generator (AC motor generator) 19. The vehicle motor generator system converts DC electric power of a battery 17 by means of the electric power converter 11 into three-phase AC electric power so as to drive the motor generator 19 and hence provide torque to an unillustrated engine; the vehicle motor generator system also converts, by means of the electric power converter 11, three-phase AC electric power generated by the motor generator 19 driven by engine torque into DC electric power so as to supply the DC electric power to the battery 17 and an unillustrated vehicle load.

Vehicle harnesses connect the positive electrode terminal and the negative electrode terminal of the battery 17 with the high-potential DC terminal B and the low-potential DC terminal E, respectively, of an electric-power conversion unit 12; the U-phase, V-phase, and W-phase stator windings of the motor generator 19 are connected with the three-phase AC power terminals U, V, and W, respectively, of the electric-power conversion unit 12. There is illustrated a wiring inductance 18 that represents the summation of the respective wiring parasitic inductances of a high-potential wiring lead and a low-potential wiring lead for connecting the battery 17 with the electric-power conversion unit 12.

The electric-power conversion unit 12 is provided with a first arm in which N-channel-type power MOSFETs 16a and 16b, as semiconductor switches, are connected in series with each other, a second arm in which N-channel-type power MOSFETs 16c and 16db, as semiconductor switches, are connected in series with each other, and a third arm in which N-channel-type power MOSFETs 16e and 16f, as semiconductor switches, are connected in series with each other; the electric-power conversion unit 12 is configured as a so-called three-phase bridge-type electric-power conversion circuit in which the first, second, and third arms are connected in parallel with one another. The respective both terminals of each of the first, second, and third arms are connected with the DC terminals B and E of the electric power converter 11; the respective middle points of the first, second, and third arms are connected with the AC terminals U, V, and W of the electric power converter 11.

Each of the power MOSFETs 16a through 16f has a drain as a first main terminal, a source as a second main terminal, and a gate as a control terminal, and is on/off-controlled when a control circuit 13 controls the voltage between the gate and the source thereof. Each of the power MOSFETs 16a through 16f becomes a resistor device in which the channel between the drain and the source is bidirectionally conductive when it is on; each of the power MOSFETs 16a through 16f becomes a diode device that is conductive only in the direction from the source to drain when it is off.

A small-capacity capacitor 15 is connected between the DC terminals B and E of the electric power converter 11. The capacity 15 plays a role of reducing high frequency noise caused, for example, by switching each of the MOSFETs 16a through 16f, so as to suppress conduction noise and radiation noise such as radio noise. In general, when electric-power conversion unit 12 performs PWM control (pulse width modification) so as to convert the DC electric power from the battery 17 into AC electric power, a large-capacity capacitor is connected at the position of the capacitor 15 in order to smooth the voltage between the DC terminals B and E; however, in Embodiment 4, because the electric-power conversion is performed through an after-mentioned one-pulse energization method, a large-capacity capacitor is not necessarily required and hence is not provided for the sake of downsizing and cost-saving of the product.

Based on a command from an unillustrated higher-hierarchy ECU, the voltage between the DC terminals B and E, and various sensor information items such as an current in the magnetic-field winding and a rotation position of an unillustrated rotor of the motor generator 19, the control circuit 13 on/off-controls the power MOSFETs 16a through 16f of the electric-power conversion unit 12 in accordance with the operation mode and performs current control of the magnetic-field winding of the unillustrated rotor of the motor generator 19 so as to control the electric-motor output torque and the power-generator electric power generation amount. The operational power source for the control circuit 13 is internally supplied from the DC terminal B of the electric power converter 11 by way of the rush current limiting circuit 5. The rush current limiting circuit 5 is formed of any one of the rush current limiting circuits according to Embodiments 1 through 3, explained with reference to FIGS. 1 through 3.

Figure 5A:
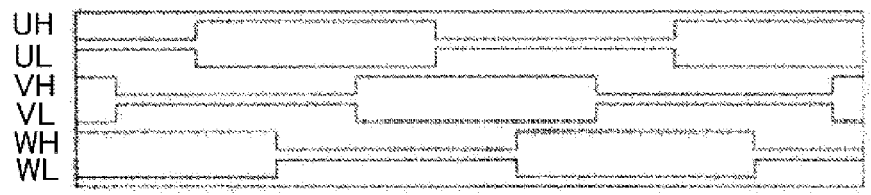
FIGS. 5A-5D are a set of waveform charts for explaining the operation of the electric power converter according to Embodiment 4 of the present invention.
Figure 5B:
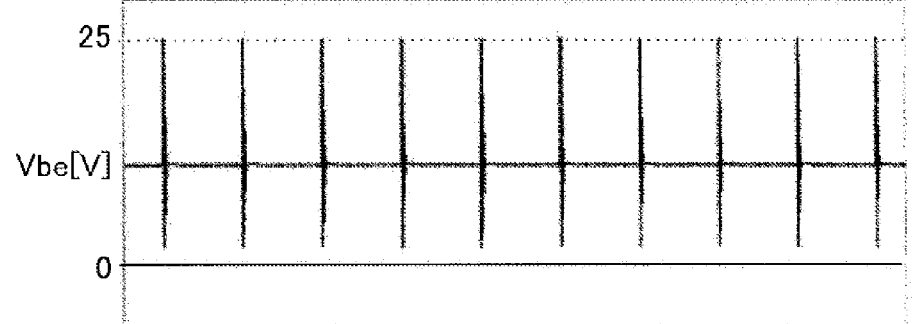
Figure 5C:
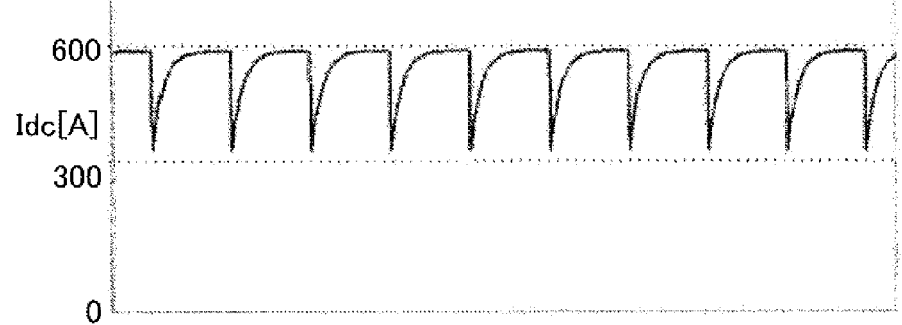
Figure 5D:
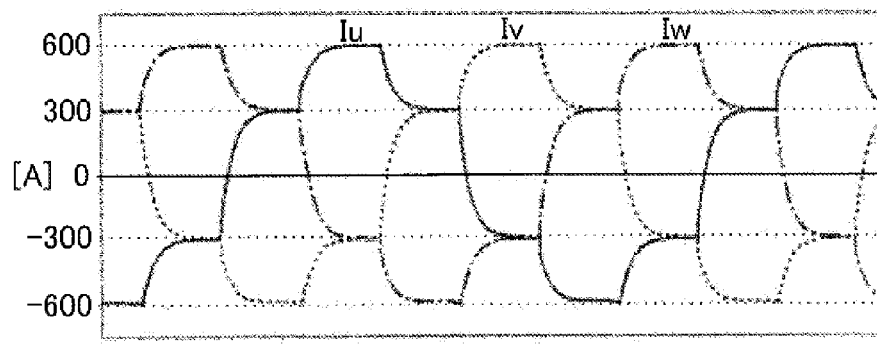

Next, the operation of the electric power converter, illustrated in FIG. 4, according to Embodiment 4 of the present invention will be explained. FIGS. 5A-5D is a set of waveform charts for explaining the operation of the electric power converter according to Embodiment 4 of the present invention and represents the operating waveforms at positions in a low-speed region where the motor generator 19 is driven by use of the one-pulse energization control of the conduction angle 180°, which is in synchronization with the electric-angular cycle of the rotor of the motor generator 19; FIG. 5A is a waveform chart representing the respective on/off logic levels of gate control signals UH, UL, VH, VL, WH, and WL for the power MOSFETs 16a through 16f to be controlled by the control circuit 13; FIG. 5B is a waveform chart of the voltage Vbe between the DC terminals B and E of the electric power converter 11; FIG. 5C is a waveform chart of a current Idc flowing in the high-potential DC line of the electric-power conversion unit 12; FIG. 5D is a waveform chart representing currents Iu, Iv, and Iw flowing in the AC terminals U, V, and W of the electric power converter 11.

In FIGS. 4 and 5A-5D, the power MOSFETs 16a through 16f to be controlled by the control circuit 13 are turned on or off when the respective logic levels of the corresponding gate control signals UH, UL, VH, VL, WH, and WL are high-level or low-level. At the switching timing of each of the respective pairs of same-phase power MOSFETs 16a and 16b, 16c and 16d, and 16e and 16f, there is secured a time (dead time) for preventing a same-phase-arm short circuit, which is caused when the same-phase power MOSFETs concurrently turn on. When the power MOSFETs 16a through 16f are turned on or off, the voltage Vbe between the DC terminals B and E of the electric power converter 11 is generated as represented in FIG. 5B, and the current Idc in the high-potential DC line of the electric-power conversion unit 12 flows as represented in FIG. 5C. The currents Iu, Iv, and Iw in the AC terminals U, V, and W of the electric power converter 11 flow as represented in FIG. 5C The current that flows in the direction from the electric power converter 11 to the motor generator 19 is represented as a positive current.

As described above, in the case where the 180-degree energization control is applied to each of the power MOSFETs 16a through 16f, the pattern of combination among the power MOSFETs 16a through 16f that are turned on in synchronization with the rotation of the motor generator 19 is sequentially changed every 60° of electric angular phase, as represented in FIG. 5A; thus, respective AC voltages are applied across the stator windings of the motor generator 19. As a result, the three-phase AC currents Iu, Iv, and Iw flow in the respective stator windings as represented in FIG. 5D.

When attention is paid on the respective turn-off timings of the Power MOSFETs 16a through 16f, one of the pair of the high-potential and low-potential power MOSFETs, which are both on, turns off each time; therefore, approximately half of the DC current Idc (refer to FIG. 5C that is supplied from the battery 17 is cut off. Accordingly, a reverse electromotive voltage is generated in the wiring inductance 18; therefore, a surge voltage is observed every 60° of electric angular phase in the Vbe waveform chart represented in FIG. 5B. In contrast, each of the power MOSFETs 16a through 16f turns on in the phase where the current flows in the direction from the source to the drain, i.e., where the current flows in each of the parasitic diodes of the power MOSFETs 16a through 16f; thus, no remarkable change appears in the Vbe waveform chart.

As described above, in the electric power converter illustrated in FIG. 4, because the operation of the electric power converter 11 makes a steep voltage rise occur frequently, as represented in FIG. 5B, at the DC terminal B, of the electric power converter 11, that functions as the operating voltage for the control circuit 13, a rush current flows in the control circuit 13 each time the steep voltage rise occurs; however, when the rush current limiting circuit 5 is provided, the rush current is smoothly limited to a predetermined value without causing any overshoot, as explained in Embodiment 1.

Accordingly, because being provided with a rush current limiting circuit, the electric power converter according to Embodiment 4 of the present invention makes it possible that the DC terminal B of the electric power converter 11 internally supply the operating power source for the control circuit 13. As a result, no vehicle harnesses and connector connection points for externally supplying a power source dedicated to the operating power source for the control circuit 13 are required; therefore, simplification and weight-saving of the vehicle harness can be achieved; concurrently, the anxiety of a loosely connected connector or a broken harness is eliminated and hence the reliability of the system is raised.

In the scope of the present invention, the embodiments thereof can freely be combined with one another and can appropriately be modified or omitted.

INDUSTRIAL APPLICABILITY

The present invention can be applied to the field of a rush current limiting circuit that is provided in a power source input unit or the like of a load and limits a rush current in a circuit for controlling current supply from the power source to the load by use of a semiconductor switch and to an electric power converter including the rush current limiting circuit; thus, the present invention can be applied to the field of an automobile industry where such an electric power converter is utilized.

DESCRIPTION OF REFERENCE NUMERALS

1: switch
2: power source (DC power source)
3: load
4: voltage limiting circuit
5: rush current limiting circuit
11: electric power converter
12: electric-power conversion unit
13: control circuit
15: noise preventing capacitor
16a through 16f: power MOSFETs
17: battery
18: wiring inductance
19: motor generator
Q1: 1st transistor
Q2: driving transistor
Q3: 2nd transistor
C1: capacitor
L1: inductor D1: diode
R1: 1st resistor
R2: 2nd resistor
R3: rush current detection resistor (3rd resistor)
R4: 4th resistor
R5: 5th resistor

The invention claimed is:

1. An electric power converter comprising:
an electric-power conversion unit that has a three-phase bridge circuit in which each of arms is formed of a power semiconductor switch, in which a DC power source is connected between DC terminals, and in which each of armature windings of a rotating electric machine is connected between corresponding AC terminals; and
a control circuit that controls the power semiconductor switches,
wherein there are provided a motor operation mode in which the rotating electric machine is made to operate as a motor and an electric-power-generator operation mode in which the rotating electric machine is made to operate as an electric power generator,
wherein in the motor operation mode, the power semiconductor switches are controlled by the control circuit in such a way that the electric-power conversion unit converts DC electric power from the DC power source into AC electric power, and in the electric-power-generator operation mode, the power semiconductor switches are controlled by the control circuit in such a way that the electric-power conversion unit converts AC electric power outputted from the rotating electric machine, which is driven by a driving source so as to generate electric power, into DC electric power,
wherein the control circuit is supplied with an operational power source from the DC power source through a positive electrode of DC terminals of the electric-power conversion unit, by way of a rush current limiting circuit, and in the electric-power-generator operation mode, the control circuit controls the power semiconductor switches in such a way that one pulse is energized in synchronization with an electric-angular cycle of a rotor of the rotating electric machine, and
wherein the rush current limiting circuit has a series circuit that is connected between the DC power source and the first semiconductor switch and is formed of an inductor and a current detection resistor that are connected in series with each other and a second semiconductor switch whose inter-output-terminal voltage is controlled by a voltage across the series circuit; and based on an inter-output-terminal voltage of the second semiconductor switch, the rush current limiting circuit controls an inter-control-terminal voltage of the first semiconductor switch so as to limit an electric current to the control circuit.

2. The electric power converter according to claim 1, wherein a circulation diode is connected in parallel with the inductor or the series circuit.

3. The electric power converter according to claim 1, further including a voltage limiting circuit that turns on the second semiconductor switch when a voltage applied to the control circuit exceeds a predetermined value.

4. The electric power converter according to claim 1, further including a voltage limiting circuit that turns on the second semiconductor switch when the voltage of the DC power source exceeds a predetermined value.

5. The electric power converter comprising:
an electric-power conversion unit that has a three-phase bridge circuit in which each of arms is formed of a power semiconductor switch; and
a control circuit that controls operation of the power semiconductor switches,
wherein there is provided a motor operation mode in which the three-phase bridge circuit to be controlled by the control circuit converts DC electric power from a DC power source into AC electric power and supplies electric power to a rotating electric machine so that the rotating electric machine is made to operate as a motor, and there is provided an electric-power-generator operation mode in which the three-phase bridge circuit converts AC electric power generated by the rotating electric machine, which is driven by a driving source, into DC electric power and supplies electric power to the DC power source so that the rotating electric machine is made to operate as an electric power generator,
wherein in the motor operation mode in which the rotating electric machine is made to operate as a motor, the control circuit controls the power semiconductor switches by use of a one-pulse energization method that is in synchronization with an electric-angular cycle of a rotor of the rotating electric machine, and
wherein the control circuit is supplied with an operational power source from a positive electrode of DC terminals of the electric power converter, by way of the rush current limiting circuit according to claim 1.

* * * * *